Oct. 22, 1946.  W. H. HUTTER  2,409,938
PILOT TRAINER
Filed July 24, 1942
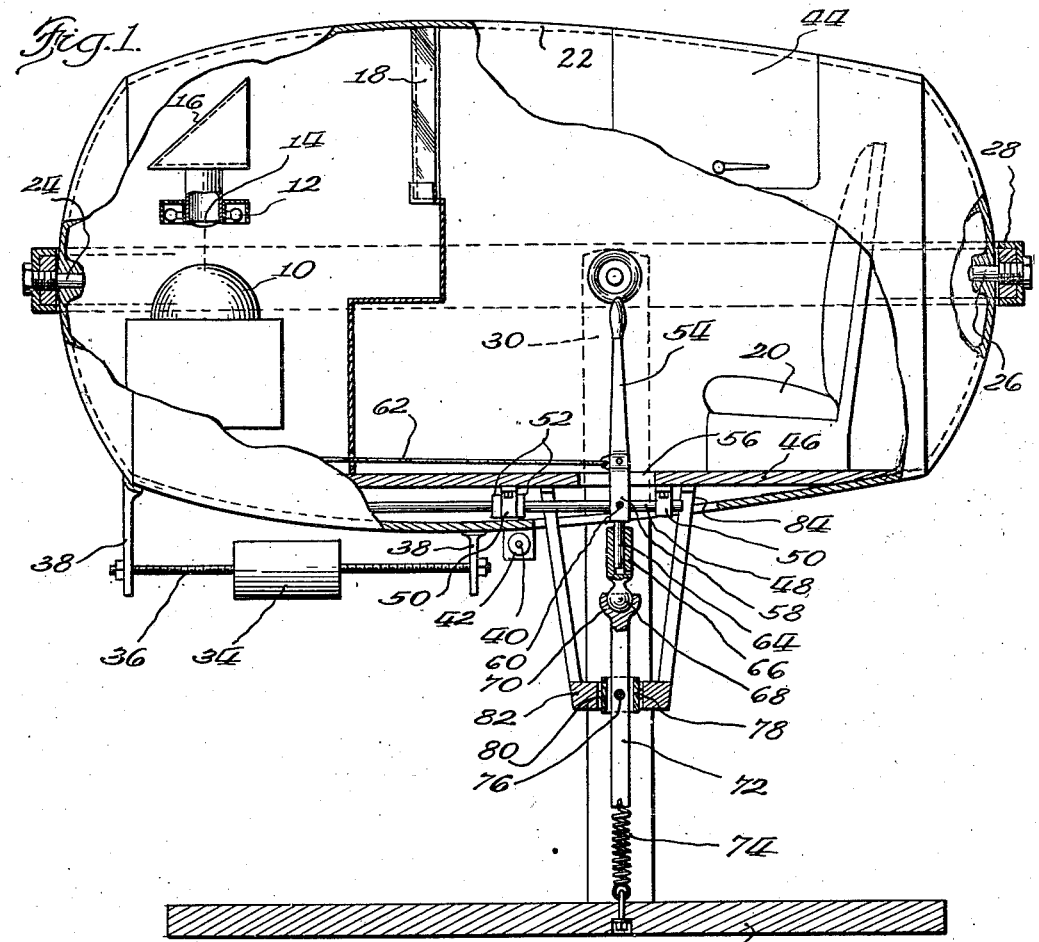
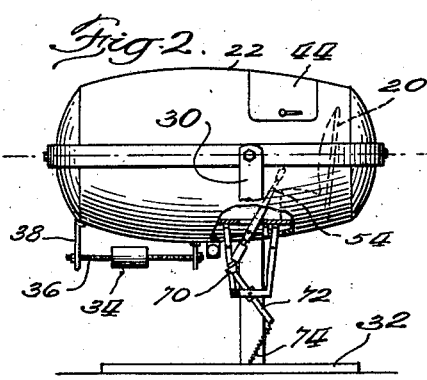
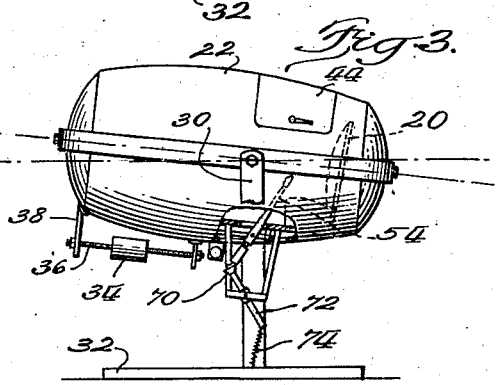
Inventor:
William H. Hutter
By
Williams, Bradbury & Hinkle
Attys.

Patented Oct. 22, 1946

2,409,938

UNITED STATES PATENT OFFICE 2,409,938

PILOT TRAINER

William H. Hutter, Chicago, Ill.

Application July 24, 1942, Serial No. 452,139

3 Claims. (Cl. 35—12)

The present invention relates to pilot trainers and is more particularly concerned with the provision of apparatus for training aircraft pilots on the ground.

One of the objects of the present invention is to provide an improved aircraft trainer.

A further object of the present invention is to provide an aircraft trainer in which the student operator is moved about an axis of rotation in such a manner that he experiences substantially the same physical sensation as would be encountered in an airplane in which the controls were similarly moved.

Yet another object of the present invention is to provide apparatus having the above characteristics and in which a scene observed by the operator moves under the influence of the aircraft controls in the same manner that a similar scene moves when controls of a conventional airplane are similarly operated.

Yet another object of the present invention is to provide novel apparatus for training pilots in which the operator receives a visual and physical sensation similar to that received in a conventional airplane.

Yet another object of the present invention is to provide a novel trainer which has mechanism for shifting the view seen by the pilot in the same manner that the view shifts when seen from a conventional airplane with novel mechanism for preventing the operator from gaining the erroneous impression that the controls are reversed.

Yet another object of the present invention is to provide novel training mechanism so arranged that movement of a control stick causes movement of the operator about an axis and in which movement of the control stick into any position causes a continuous motion of the operator for a substantial time interval.

Other objects and advantages will become apparent from the following description of a preferred embodiment of my invention.

In the accompanying drawing, in which similar characters of reference refer to similar parts throughout the several views:

Fig. 1 is a side elevation of a trainer embodying the present invention with parts thereof broken away to illustrate portions of the mechanisms in longitudinal section; and Figs. 2 and 3 are similar views on a reduced scale illustrating one of the movements of the trainer under the influence of movement of the control stick.

In the Lucien J. Beindorf Patent No. 2,336,436, issued December 7, 1943, there is shown an aircraft trainer in which the view observed by the operator moves under the influence of movement of the aircraft controls in substantially the same manner as a scene viewed from a conventional aircraft appears to move when the aircraft controls are similarly manipulated. Although the specific arrangement for accomplishing this scene movement is not a portion of the present invention, this illusion is in short accomplished by providing a sphere 10 having a horizon line there-around, half of the sphere being painted to simulate the sky and the other half being painted to simulate the earth. The upper portion of this sphere is illuminated by a ring of incandescent electric light bulbs 12 surrounding a lens 14. An image of the upper lighted portion of the sphere is projected through the lens 14 and is reflected by a mirror 16 upon a translucent screen 18, this image being viewed by a pilot operator located in the seat 20.

Movement of the aircraft controls operates mechanism associated with the sphere 10 in such a manner that the sphere is rotated in the proper direction at the proper speed so that the view projected upon the screen 18 at all times simulates the proper view. For instance, if the operator pulls backwardly upon the stick, the sphere will rotate in such a direction as to cause the horizon line upon the screen 18 to move downwardly. Similarly, movement of the stick to the front causes the horizon line to move upwardly while movement of the stick from side to side causes the horizon line to tilt one way or the other, and movement of the rudder pedals causes the whole scene to shift from side to side.

Because the scene on the sphere 10 is continuous and because the mechanism provided in the before-mentioned patent is adapted to cause the sphere 10 to move into any position at any desired speed, it is possible to manipulate the aircraft controls so as to cause continuous motion of the scene in one direction without approaching the edge of the scene, that is, it is never necessary to return the aircraft to any central portion of the screen in order to execute a new maneuver as is true with some earlier training devices.

Although the above set out trainer comprising the invention described and illustrated in the aforementioned patent admirably simulates the view seen from an aircraft, the principal difficulty encountered is that operators frequently are given the illusion that the controls are reversed. That is, they find it difficult to make the assumption that the scene is stationary and that the observer is moving about the scene. For instance, moving the control stick rearwardly causes the horizon line to drop, and although this is exactly what happens in a conventional aircraft when the stick is moved rearwardly, still operators of the trainer find it difficult to assume that the scene is holding still and that the nose of the airplane is being pointed above the horizon. They are in fact inclined to believe that they are holding still and that the earth is moving downwardly, and in spite of the fact that the scene simulates the earth and sky, they nevertheless appear to feel that moving the control stick rearwardly has caused the nose of the airplane to drop. The same thing is true if the stick is moving forwardly or if it is moved from side to side. Movement to the rudder pedals, however, does not seem to give such a pronounced false impression, it being found, for instance, that once the operator gets the proper impression relative to the elevator and aileron controls, the proper impression as to the rudder controls follows almost automatically. It was with the above in mind that the present invention was developed for the purpose of preventing an operator from obtaining the incorrect impression that the controls are reversed in a trainer of the type illustrated in the previously mentioned patent.

Referring particularly to Fig. 1 of the drawing, it will be seen that the scene forming and projecting mechanism, comprising the parts numbered from 10 to 18 previously mentioned, is housed within the forward portion of a hollow somewhat egg-shaped body shell 22. This shell near its rearward end contains the seat 20 in which the operator sits and is journaled at its forward and rearward ends respectively upon pins 24 and 26 secured in a gimbal ring 28 that surrounds the body shell at approximately its meridian line. The body shell, therefore, is free to rotate about a longitudinal axis.

The gimbal ring 28 is in turn pivoted at each side to a pair of upright members 30 secured at their lower ends to a base 32. By means of this construction the trainer is free to tilt upwardly or downwardly or to roll from side to side. The center of gravity of the device should be located slightly below the intersection of the two axes of rotation so that the trainer will have a slight tendency to right itself. This tendency should not be too strong, however.

Inasmuch as different operators seated in the seat 20 will be of different weights, a longitudinally movable counterweight 34 is suspended beneath the forward portion of the shell on a threaded rod 36 attached at its ends to brackets 38 fastened to the lower portion of a body shell. Thus when a heavy operator is placed in the seat 20, the weight 34 will be rotated so as to move it forwardly along the threaded shaft 36 until the operator is balanced. Likewise a light-weight operator is balanced by moving the weight 34 rearwardly.

Inasmuch as the apparatus may need trimming about its longitudinal axis, a similar transversely extending threaded shaft 40 is provided which mounts a counterweight 42 similar to the weight 34, excepting that it may be much smaller. The weight 42 is moved from side to side when necessary to balance the trainer.

Although it is not specifically shown in the drawing, it is desirable that some type of removable stand or other structure be used to maintain the trainer in an upright position when it is empty and while an occupant is climbing in and out. After the occupant is in place, the stand will normally be removed. The operator enters the trainer through a hatch in the upper part of the shell 32 closed by a door 44. The operator is thus totally enclosed and can see nothing except the image on the screen 18.

The lower portion of the trainer is covered by a floor-board 46 beneath which is secured a longitudinally extending centrally located rotatable shaft 48. This shaft is journaled in pillow blocks 50 and is prevented from sliding longitudinally by collars 52 secured thereto on each side of the forward pillow block. A control stick 54 extends upwardly through an opening 56 in the floor-board with its upper portion in a position between the knees of the operator.

Beneath the floor-board the stick is formed to provide a yoke 58 which surrounds the rod 48 and which is pivoted to the rod by a pin 60 extending transversely through the yoke and rod. The stick is therefore free to move arcuately in a forwardly and backwardly direction, while side to side movement of the stick is accomplished through the rotation of the shaft 48 in the pillow blocks 50. Although not specifically shown, since its illustration would not serve to elucidate the present invention, the forward portion of the rod 48 actuates the aileron control to the sphere rotating mechanism, while a cable 62 connected to the stick above the pin 60 actuates the mechanism for shifting the sphere so as to raise and lower the horizon.

A cylindrical pin 64 extends downwardly from the yoke 58 and into a cylindrical socket 66 having a ball 68 at its lower end. This ball is in turn enclosed in a socket 70 which embraces slightly more than half the circumference of the ball 68 to prevent separation of the ball and socket joint thus formed. The socket 70 is formed at the upper end of a downwardly extending bar 72 connected at its lower end to the upper end of a coil spring 74, the lower end of which is anchored to the base 32. Near its midpoint the bar 72 is pivoted upon a transversely extending pin 76 secured at its ends in a ring 78, the ring in turn being pivoted about longitudinally extending pins 80 secured to a framework structure 82, the upper ends 84 of which are secured to the floor-board of the trainer.

The double yoke construction provided by the ring 78 and the transversely and longitudinally extending pins 76 and 80 permits the bar 72 to be inclined in any direction. Further it will be seen upon inspection of the drawing that in whatever direction the stick 54 is inclined, the bar 72 will be inclined in the opposite direction. This may best be seen in Figs. 2 and 3.

After the operator is in place and the weights 34 and 42 have been moved to the proper locations to balance the shell 22 as desired, the operation of the device is as follows: Assuming that the operator moves the upper end of the stick rearwardly, as shown in Fig. 2, this inclines the lower end of the stick forwardly, thus moving the lower end of the bar 72 rearwardly. This position is shown in Fig. 2. The spring 74, therefore, is stretched and has its upper end moved into a position behind its lower end. The tendency of the spring to return to its minimum length will pull the lower end of the bar 72 forwardly as shown in Fig. 3, thus causing the forward end of the shell 22 to be inclined upwardly. The reverse of this action will take place if the upper end of the stick is moved forwardly, while side to side movement of the stick will cause side to side rolling of the body shell 22 about the pins 24 and 26.

The trainer should be well balanced, as otherwise the spring 74 will need to be quite heavy, with the result that considerable effort will be necessary to move the stick 54. The trainer, even though well balanced, has considerable mass, therefore, when the stick 54 is moved in one direction quickly, for instance, backwardly as shown in Fig. 2, an appreciable time interval will elapse before the spring 74 will have ceased to move the body shell 22. In other words, quick backward movement of the stick will cause the body shell gradually and smoothly to be inclined upwardly. Similarly, sudden movement of the stock in any other direction will cause a gradual movement of the shell in the proper direction. This action is similar to that which takes place in a conventional airplane. That is, if the stick is moved backwardly in an airplane and held in this position, the airplane does not instantaneously assume a climbing attitude and then remain there. Rather the airplane, over a period of as much as a few seconds, moves from the horizontal toward the vertical. By properly proportioning the strength of the spring 74 together with the mass of the trainer and the position of the center of gravity of the trainer, the trainer can be caused to respond like a comparatively stable airplane such as a transport or heavy bomber, or like a comparatively unstable airplane of the pursuit type, for instance.

With a trainer embodying the present invention, the operator does not get the illusion that the controls are reversed. This is because the movement of the pilot and the shifting of the image on the screen are coordinated, with the result that the operator does not have the tendency to think of the scene as being the moving member while he remains stationary. It is appreciated that movement of the scene may take place to a considerably greater extent than the actual movement of the trainer shell 22. That is, if the operator moves the stick 54 rearwardly, thus causing the horizon to drop while causing the forward end of the trainer to tilt upwardly, and further, if the stick is retained in the rearward position, the scene on the screen 18 will continue to change even after the trainer itself has stopped moving. The initial movement, however, of the trainer is enough to complete the illusion so that the operator continues to think of the controls as acting properly throughout the maneuver.

If desired, unusual operating conditions can be simulated with a trainer as above described, for instance, the weight 34 can be moved slightly forwardly of the position required to balance the trainer so as to simulate nose heaviness. Likewise rearward movement of the weight will simulate tail heaviness, while movement of the weight 42 toward one side or the other will simulate heaviness on that particular side of the airplane.

From the above description of a preferred embodiment of my invention, it will be seen that a suitable training device is provided in which the visual impression presented upon the screen 18 is correlated with physical movement of the pilot in such a manner that the psychological impression of flying is completed. Further, it will be seen that through the use of this invention the normal tendency of the operator when viewing a movable scene upon a screen to feel that the controls are reversed is eliminated.

While I have shown and described a particular embodiment of my invention, it will be apparent to those skilled in the art that numerous modifications and variations may be made without departing from the underlying principles of the invention. I, therefore, desire by the following claims to include within the scope of the invention all such modifications and variations by which substantially the results thereof may be obtained by the use of substantially the same or equivalent means.

I claim:

1. An apparatus for creating the illusion of flying which comprises means to present a view to an operator and for moving the view under the influence of movement of airplane controls in the same manner that a view moves when seen from a conventional airplane, and means for preventing the operator from gaining the impression that the controls are reversed, the last said means comprising a pilot seat movable about at least one axis, and means to cause movement of said pilot seat about said axis under the influence of the operation of the controls when said controls are operated to cause movement of said view about the same axis.

2. An apparatus for creating the illusion of flying which comprises means to present a view to an operator and for moving the view under the influence of movement of airplane controls in the same manner that a view moves when seen from a conventional airplane, and means for preventing the operator from gaining the impression that the controls are reversed, the last said means comprising a pilot seat movable about at least two axes of rotation, and means to cause movement of said pilot seat about said axes under the influence of the operation of the controls when said controls are operated to cause movement of said view about the same axes.

3. A pilot trainer comprising a seat, a pivoted supporting structure for said seat, spring means attached to said supporting structure normally tending to urge said supporting structure and said seat into an upright position, control means operable by an operator seated in said seat, and means actuated by movement of said control means for shifting the point of attachment of said spring means to said supporting structure relative to said pivot so that said spring means in tending to return to its minimum stressed condition will tend to move said supporting structure and said seat away from said normal position.

WILLIAM H. HUTTER.